United States Patent
Lin et al.

(10) Patent No.: US 12,431,547 B1
(45) Date of Patent: Sep. 30, 2025

(54) CHIP-INTEGRATED INTELLIGENT BATTERY SYSTEM

(71) Applicant: Chemix Inc., Sunnyvale, CA (US)

(72) Inventors: Kaixiang Lin, San Francisco, CA (US); Jason Koeller, San Mateo, CA (US); Lyle Kaplan-Reinig, San Jose, CA (US)

(73) Assignee: CHEMIX INC., Sunnyvale, CA (US)

( * ) Notice: Subject to any disclaimer, the term of this patent is extended or adjusted under 35 U.S.C. 154(b) by 0 days.

(21) Appl. No.: 18/922,254

(22) Filed: Oct. 21, 2024

Related U.S. Application Data

(60) Provisional application No. 63/690,888, filed on Sep. 5, 2024.

(51) Int. Cl.
| | |
|---|---|
| *H01M 10/42* | (2006.01) |
| *H01M 10/48* | (2006.01) |
| *H01M 50/103* | (2021.01) |
| *H01M 50/15* | (2021.01) |

(52) U.S. Cl.
CPC ..... *H01M 10/4257* (2013.01); *H01M 10/488* (2013.01); *H01M 50/103* (2021.01); *H01M 50/15* (2021.01); *H01M 2010/4271* (2013.01); *H01M 2010/4278* (2013.01)

(58) Field of Classification Search
CPC .......... H01M 10/4257; H01M 50/103; H01M 50/15; H01M 10/488
See application file for complete search history.

(56) References Cited

U.S. PATENT DOCUMENTS

| | | | |
|---|---|---|---|
| 2013/0295421 A1* | 11/2013 | Teramoto | H01M 10/02 429/61 |
| 2022/0225070 A1* | 7/2022 | Daoura | H04W 4/02 |

\* cited by examiner

*Primary Examiner* — Olatunji A Godo
(74) *Attorney, Agent, or Firm* — Geeta Kadambi; RIDDHI IP LLC

(57) ABSTRACT

The chip-integrated intelligent battery system (CIBS) device allows an ultra-fast collection of high-fidelity battery data including, but not limited to, battery voltage, current, external and internal temperature, pressure, gaseous species, vibration and mechanical impact, during the cell operation from the moment the cell is manufactured. CIBS is integrated with actuator, microprocessor, data storage, data transmission, current sensor, voltage sensor, gas pressure sensor, gas species sensor, and power source leads, to provide instant feedback on various parameters inside the battery to assess the battery's performance. The data from CIBS is collected via an integrated or a discrete antenna and streamed wirelessly or through a wired system to a separate control device. Such a device can be part of or a discrete component of the battery management system.

14 Claims, 17 Drawing Sheets

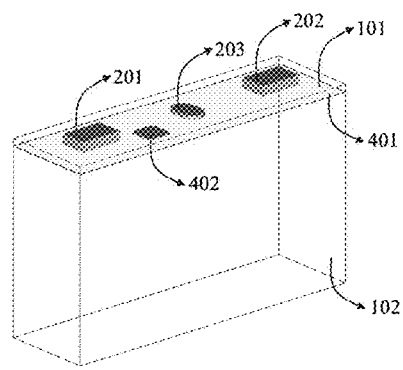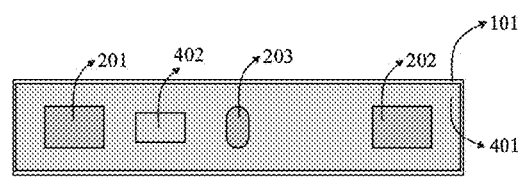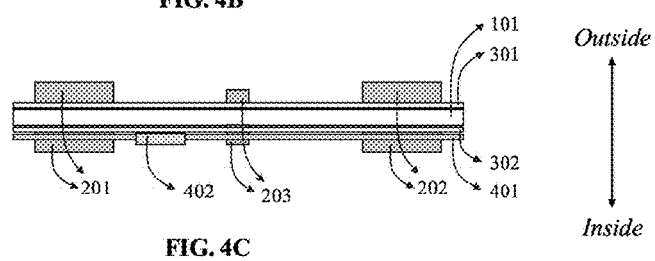
FIG. 4A
FIG. 4B
FIG. 4C

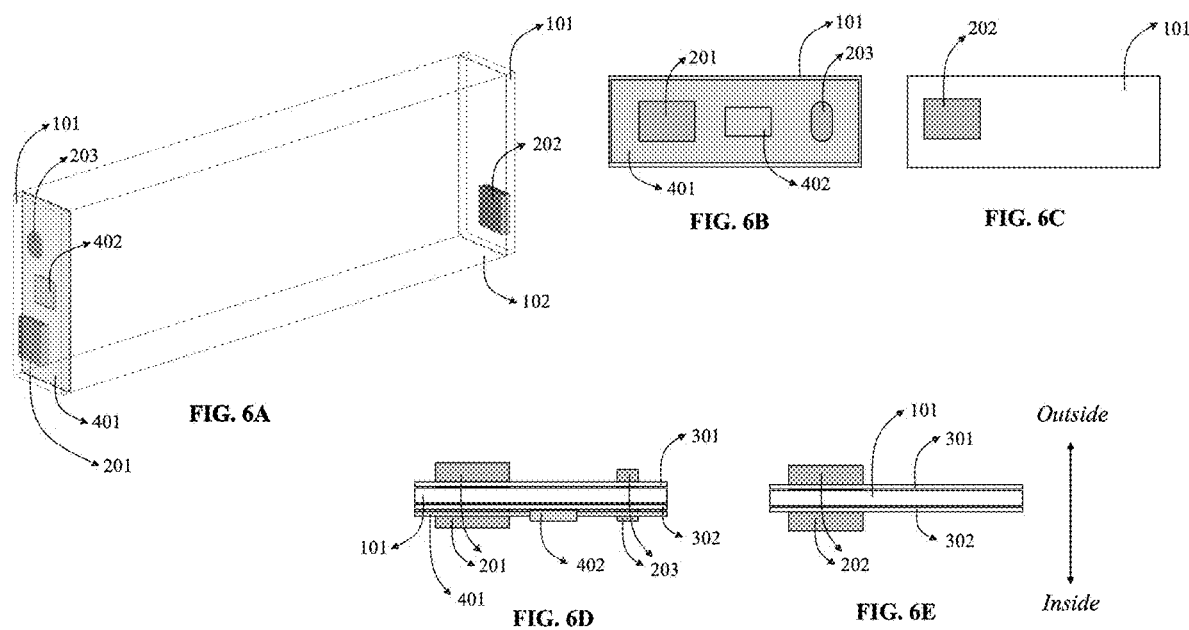

CHIP-INTEGRATED INTELLIGENT BATTERY SYSTEM

CROSS-REFERENCE TO RELATED APPLICATIONS

This application is a utility application of provisional U.S. application No. 63/690,888 filed on Sep. 5th 2024 and the contents of which are incorporated in their entirety.

FIELD OF DISCLOSURE

This disclosure relates generally to a chip-integrated intelligent battery system as a device, a system and method for rapidly collecting high-fidelity battery operating usage data is disclosed.

BACKGROUND

Batteries are a cornerstone of modern technology, playing a crucial role in the functioning and advancement of portable electronics, electric vehicles (EVs), and energy storage systems (ESS). In the realm of EVs, batteries are essential as they are the primary source of power, replacing traditional internal combustion engines. The performance, range, and efficiency of EVs are directly linked to the capabilities of their batteries. ESS are another critical area where batteries play a pivotal role. These systems store intermittent energy generated from renewable sources like solar and wind, making it available for use when production is low or demand is high. Effective energy storage solutions are essential for stabilizing the grid and ensuring a reliable power supply, as batteries can help smooth out the variability of renewable energy sources and facilitate a more resilient and sustainable energy infrastructure. In addition to the strong interconnection between battery performance and the end EV and ESS applications they are powering, batteries also remain the biggest single contributor to the bill-of-materials (BOM) and the biggest safety risk factor of these systems.

Despite the critical nature of batteries, they are very complex electrochemical systems akin to a black box, which makes assessing and predicting its current and future state of performance (e.g. electrochemical properties, safety, remaining useful longevity, etc.) either extremely difficult, expensive, or impossible with existing technologies. For instance, a pristine, partially degraded, and end-of-life battery may look identical from the outside; to accurately tell them apart, either complex and time-consuming electrochemical testing or destructive spectroscopic analysis is needed. This is a much more serious challenge when the battery is already integrated into an EV or ESS system given that any complex or destructive analysis is impractical or infeasible, without disrupting the normal operation or destroying the whole energy storage system.

While the recent progress in artificial intelligence (AI), such as machine learning (ML) or deep learning, has enabled prediction of battery state of performance, such application has largely been limited to laboratory settings where researchers can have a stricter control of the data quality (fidelity), by thoroughly recording the battery testing conditions and by using large and commercially-relevant format batteries, and can scale data quantity straightforwardly by increasing the number of testing channels and expanding the variety of testing conditions. Such an effort to expand the AI-powered and data-driven approach to understand and predict the battery state of performance based on real-world (field) data, however, is still hindered by the lack of availability of data of sufficiently high fidelity and quantity. EV and pack companies, who play the role of integrating cells into industrialized modules, packs, and powertrains typically have their proprietary approach to design their module and pack mechanical structure and thermal management system, e.g. with or without active or passive cooling/heating, depending on the specific end use applications. Therefore, even when integrating the exact same battery cell format and chemistry, which have been thoroughly studied in the laboratory environment, the fidelity of battery operating data can vary widely depending on the specific module and pack mechanical design, thermal management, types, position, or availability of sensors within the pack. This has rendered building a generalized AI model to leverage these low-fidelity battery data extremely non-scalable and expensive. There is a need for a newer approach to gather data for analysis.

SUMMARY

This disclosure relates generally to a chip-integrated intelligent battery system (CIBS) device and method for rapidly collecting high-fidelity battery operating data using a chip-integrated intelligent battery system board (board) that can detect battery voltage, current, external and internal temperature, pressure, gaseous species present, vibration and mechanical impact, from the moment the cell is manufactured across various real-world or laboratory settings. In one embodiment, a prismatic end plate comprises of a chip-integrated intelligent battery system board (board). In another embodiment, a battery cell is enclosed on one side or multiple sides with the prismatic end plate.

In one embodiment, the chip-integrated intelligent battery system board is physically mounted to the battery cell either on the outside or inside. In one embodiment CIBS could be one chip or multiple chips connected or disparate to each other. This enables multifunctional software to be used for various functions and detections. In one embodiment, the device can detect battery voltage, current, external and internal temperature, pressure, gaseous species present, vibration and mechanical impact. In one embodiment, the health and functionality of the battery may be monitored from the moment the cell is manufactured across various real-world or laboratory settings. In one embodiment, a microprocessor unit, an actuator, data storage unit, data transmission unit, wireless antenna, current sensor, voltage sensor, gas pressure sensor, gas species sensor, and power leads are connected to the CIBS board individually or in combination to provide instant feedback on various parameters inside the battery to access the battery's performance.

In another embodiment, when the board is integrated directly to the body of the battery cell, its size, shape, and mechanical properties, such as flexibility, strength, etc., can be adjusted based on the specific battery form factor and the end use cases of the batteries. By having the direct measurement of internal battery cell temperature, pressure, and gas formation and composition, one can identify unrealized issues and trigger warning of developing safety risks much sooner than traditional sensing technologies as well as potentially intervene via the integration of actuators to isolate the problematic cells from the rest of the pack. In one embodiment, by capturing these high-fidelity data, CIBS, coupled with proprietary battery-specific foundation (large AI) models, enables highly accurate understanding of the residual value and performance capabilities of the battery system and specific cells within it. This data stream can be captured during the development, integration, and real-world field settings.

In one embodiment the CIBS board may be mounted in different locations on the battery depending on the size and shape of the battery. In another embodiment, the CIBS board may comprise of one or more different types of actuators to control the operation of the cell. Examples of actuators include a triggerable gas valve/vent to release gas pressure from inside the cell, a field-effect-transistor (FET). In another embodiment, the CIBS board may not comprise of any actuators to control the operation of the cell. A system, as a flowchart for CIBS data acquisition, processing, storage, visualization, and alerting according to an embodiment of the present disclosure is also disclosed. In one embodiment, the chip integrated intelligent battery system device comprises of a data processing unit located in a cloud or an edge.

In one embodiment, the chip-integrated intelligent battery system device has the chip-integrated intelligent battery system board (board) is a standalone device that can be used inside of the battery cell. In another embodiment, the chip-integrated intelligent battery system board (board) is a standalone device that can be used outside of the battery cell. Alternatively, the chip-integrated intelligent battery system board (board) is a standalone device that is manufactured in a prismatic, pouch, or cylindrical format cell.

BRIEF DESCRIPTION OF DRAWINGS

FIG. 4A, FIG. 4B, and FIG. 4C show an example of an isometric, inside top, and side cross-sectional view of a battery cell and its prismatic end plate with the addition of a CIBS board mounted on the inside surface of the end plate.

FIG. 6A, FIG. 6B, FIG. 6C, FIG. 6D, and FIG. 6E show another example of an isometric, inside top, and side cross-sectional views of a battery cell which has multiple prismatic end plates.

Figure 1A:
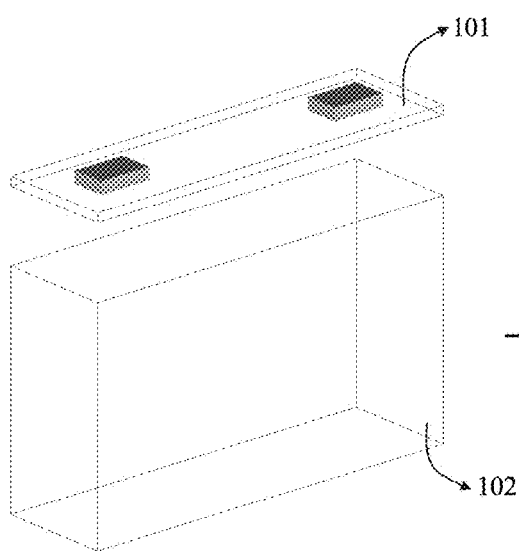
FIG. 1A and FIG. 1B illustrate the process of assembling a prismatic end plate to a battery cell, where the prismatic end plate and the battery cell body are sealed together.

Other features of the present embodiments will be apparent from the accompanying drawings and from the detailed description that follows.

DETAILED DESCRIPTION

In this disclosure a chip-integrated intelligent battery system device is disclosed such that the fidelity of battery operating data can be significantly augmented by the onboard sensor, which is used to train foundation AI models and to predict the current and future performance capabilities of EV and ESS systems. Such prediction is agnostic of battery cell format, chemistry, how it is integrated into the modules and packs, and what thermal management system or what additional suite of sensors is implemented. In the present disclosure we describe details using the following examples, which may represent more than one embodiment of the present disclosure. The chip integrated intelligent battery system (CIBS) board is either physically mounted to the outside or inside of a battery cell, or part of the prismatic end plate of a battery cell. Depending on the nature of data it is collecting, sensors within CIBS may be electronically connected to the terminal of the prismatic end plate, or positioned outside or inside of the battery cell, or in direct or indirect contact of the battery cell internal environment such as temperature or pressure.

The CIBS board may comprise of multiple separate microchips, or a single system-on-chip (SOC), to handle the data acquisition operations as well as the communication between the chip and other devices. Using separate chips allows for significant flexibility and revisions in the design as needs evolve. Meanwhile, using a single SOC may be more cost effective at high volumes, in the end, consume less power and be more compact if optimized properly.

The CIBS board may comprise or consist of two or more boards which can be connected together or a single piece which has all of the components already integrated. Using multiple smaller boards can enable a more modular construction which can facilitate providing a range of optional features (i.e. sensors and communication interfaces) in a flexible way. The CIBS board may be built as a flexible printed circuit board (PCB) or a rigid PCB. This allows for optimal incorporation of the CIBS capabilities into a variety of cell form factors and positions within the cell. The CIBS board may be mounted on either or both the outside and/or inside surface of the prismatic end plate, or span from the inside surface to the outside surface of the end plate itself. Having the CIBS board (partially) inside of the cell allows for sensors on the CIBS board to be closer to the interior of the cells and therefore provide more accurate measurements of the environment inside the cell. Forming a prismatic end plate from a CIBS board which spans from the inside surface to the outside surface of the cell enables maximum flexibility and ease in terms of measurements and communication. For example, antenna(s) can be located on the outside surface while sensors can be located on the interior surface and signals can travel between the two surfaces through standard PCB vias. CIBS board has an upper layer and an inside layer. The actuators, sensors and microprocessor unit, not limited to just these add on, are mounted on either surface as per the need of the battery cell and data is collected.

The CIBS board may consist of one or more different types of sensors to measure attributes of the cell interior, exterior, or environment surrounding the cell. Examples of attributes to measure include the voltage between two of cell's electrodes, the electrical current flowing through the cell, the temperature inside or outside of the cell (and potentially in multiple locations within/around the cell), gas or liquid species inside or outside of the cell, acceleration or vibration experienced by the cell, the gas pressure inside or outside of the cell. The sensor data in part or together enable greater insights into the battery health, remaining useful life, and capability for use in secondary applications.

The CIBS board comprise or consist of one or more different types of actuators to control the operation of the cell. Examples of actuators include a triggerable gas valve/vent to release gas pressure from inside the cell, a field-effect-transistor (FET) to regulate the current flow. These actuators provide mechanisms for increasing safety of the cells by mitigating hazards through proactive measures.

The CIBS board may comprise or consist of one or more interfaces for communication. These may include wired and wireless interfaces. Some examples of wireless interfaces include radio frequencies in the industrial, scientific, and medical bands (ISM), Bluetooth Low-Energy (BLE), Wi-Fi, and telecommunications bands such as 5G. Some examples of wired interfaces include controller area network (CAN) bus, inter-integrated circuit (I2C), and serial peripheral interface (SPI).

The CIBS communication interface wired connector(s) or wireless antenna(s) may be located in the SOC, located alongside a microcontroller, or exist as a discrete component which is connected to the microcontroller board. Separating the antenna from the SOC or microcontroller allows each component to be more optimally located on/within the cell. The data flow within a CIBS-enabled battery management system may take on many different forms. In the following descriptions, "data processing" may include one or more of the following: noise filtering, temperature compensation, down sampling, aggregation, or other parameter calculations.

In one embodiment, the raw data from the sensors are processed directly on the cell itself before the processed data, potentially in addition to the raw data, are passed on to downstream data consumers such as the battery management system. Having data processing located on the cells themselves enables rapid identification of potential safety issues along with rapid mitigation response without the need for a centralized battery management system (BMS) to receive the data, process it, and send a response back to the cell which may have its own sources of failure. It is likely that data is still sent on to the BMS for further processing as well as eventually to the cloud for additional analysis. From the BMS or cloud, commands may be sent back to the cells directly or via the edge/BMS compute resources.

In one embodiment, the raw data from the sensors are passed through in their entirety to a downstream edge data processor which may exist in relatively close proximity to the cell(s) but not on/within the cells themselves. This enables compute resources to be shared across multiple cells which may be more cost effective than processing all of the data on the cell itself. For example, in an EV application, the edge processing may be performed with one or more edge processors located within a cell module, or within the cell pack, or as part of the vehicle's overall compute resources. Data is then sent to the cloud for further processing and analysis.

Figure 1B:
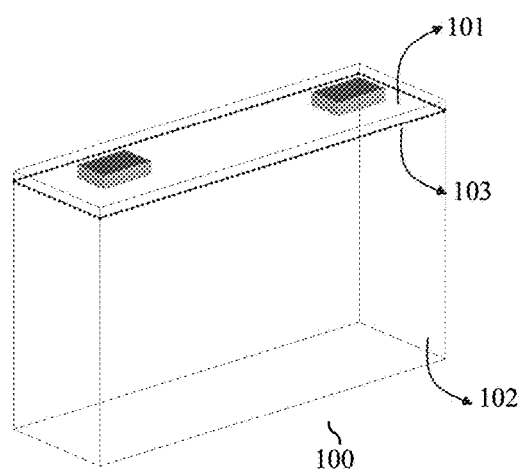

FIG. 1A and FIG. 1B illustrate the process of assembling a prismatic end plate to a battery cell, where the prismatic end plate and the battery cell body are sealed together to yield the final finished and functional battery cell. The device has a prismatic end plate 101 (also referred to as "end plate", throughout the specification) and the battery cell body 102. They are sealed together via a sealing method to yield the final finished and functional battery cell 100. The prismatic end plate is made of the material, in one embodiment but not limited to, are stainless steel, aluminum, copper, as well as plastic materials. Sealing method 103 comprises but not limited to laser welding, mechanical crimping, adhesion, heat sealing, etc. The goal of sealing method 103 is to seal the inside of the battery cell from ambient atmosphere and pressure and ensure mechanical integrity of the sealed battery cell when two or more pieces of materials are bonded together. This diagram demonstrates the generic process of assembling a battery cell, and in this example it shows a battery cell with a single prismatic end plate but it is acknowledged that there can be other battery cell configurations that have multiple end plates that seal off different sides of the battery cell.

Figure 2A:
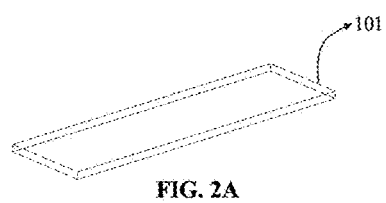
FIG. 2A, FIG. 2B, FIG. 2C, FIG. 2D, FIG. 2E, and FIG. 2F illustrate multiple examples of prismatic end plates.
Figure 2B:
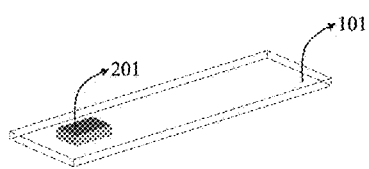
Figure 2C:
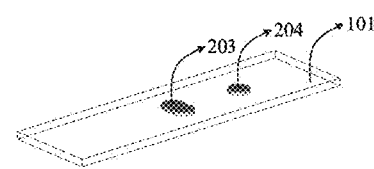
Figure 2D:
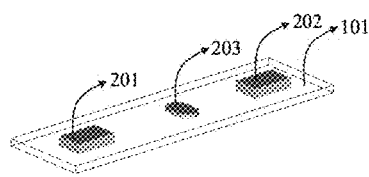
Figure 2E:
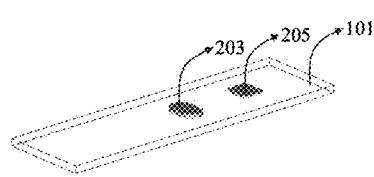
Figure 2F:
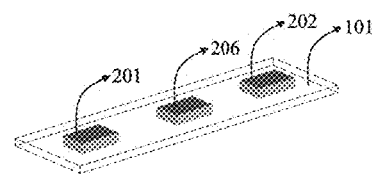

FIG. 2A, FIG. 2B, FIG. 2C, FIG. 2D, FIG. 2E, and FIG. 2F illustrate multiple examples of prismatic end plates that show different features that may be included as part of different embodiments of the disclosure. In example FIG. 2A, prismatic end plate 101 has no functional features beyond simply providing a plate to seal the battery cell. In FIG. 2B, prismatic end plate 101 has a single electrode terminal 201 which would be electrically connected to one of the electrodes inside of the cell here "electrodes inside of the cell" may refer to a single electrode sheet or multiple electrode sheets that are connected to the same electrode terminal. The electrode terminals are electrically isolated from the prismatic end plate and body of the cell (except where otherwise noted). In FIG. 2C, prismatic end plate 101 has a gas pressure relief valve 203 and electrolyte filling hole 204. In this example gas valve 203 allows gases from inside the cell to escape from the cell when a critical pressure inside of the cell is reached. In FIG. 2D, prismatic end plate 101 has electrode terminal 201, which may be connected to either the negative or positive electrode or reference electrode, and electrode terminal 202, which may be connected to either the opposite polarity terminal from 201 (i.e. positive or negative), or the same polarity electrode as 201, or to the reference electrode, and a gas pressure relief valve 203. In FIG. 2E, prismatic end plate 101 has gas pressure relief valve 203 and cell identifier 205. In this example, cell identifier 205 may be a label or barcode/QRcode and/or a radio frequency identifier (RFID) to uniquely identify the cell. In FIG. 2F, prismatic end plate 101 has electrode terminal 201, electrode terminal 202, and electrode terminal 206, which may be electrically connected to a different electrode or the same electrode as both 201 and 202 (i.e. positive, negative, reference). The present disclosure seeks to augment and enhance the features of the prismatic end plate to add significant utility beyond the current state of the art described previously.

Figure 3A:
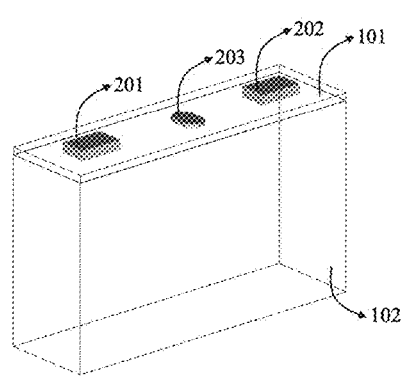
FIG. 3A, FIG. 3B, and FIG. 3C show an example of an isometric, outside top, and side cross-sectional view of a battery cell and its prismatic end plate.
Figure 3B:
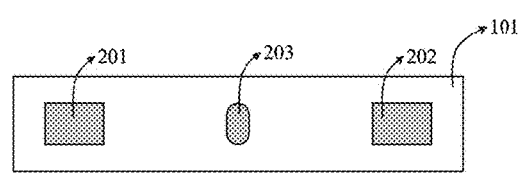
Figure 3C:
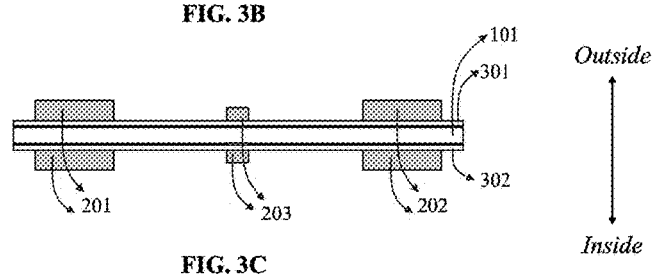

FIG. 3A, FIG. 3B, and FIG. 3C show an isometric, outside top, and side cross-sectional view of a battery cell and its prismatic end plate which may be included as part of different embodiments of the disclosure. FIG. 3A shows an isometric view of example prismatic end plate 101 sealed to cell body 102. FIG. 3B shows electrode terminal 201, which may be connected electrically to either the positive or negative electrode within the battery cell, electrode terminal 202, which may be connected to the opposite polarity electrode from 201, and gas pressure relief valve 203. FIG. 3C shows that all three elements 201, 202, and 203 span through both sides of the prismatic end plate 101 and are therefore exposed to the environment both outside and inside the battery cell body. In this example, FIGS. 3A, 3B and 3C show prismatic end plate 101 also has an outside electrically insulating layer 301 and an inside electrically insulating layer 302, which prevent the prismatic end plate from becoming an electrically conductive pathway. Insulating layers 301 and 302 may comprise one or multiple sub-layers of insulating materials. These materials may or may not provide additional structural support for the prismatic end plate.

FIG. 4A, FIG. 4B, and FIG. 4C show an isometric, inside top, and side cross-sectional view of the device with the inclusion of a CIBS board mounted on the inside surface of the prismatic end plate. FIG. 4A shows an isometric view of prismatic end plate 101, with CIBS board 402 mounted on its inside surface via a board substrate 401, attached to cell body 102. In this example, the end plate has electrode terminals 201, which may be connected electrically to either the positive or negative electrode within the cell, electrode terminal 202, which may be connected to the opposite polarity electrode from 201, and gas pressure relief valve 203. FIG. 4B shows an inside top view of end plate 101 with the elements described in FIG. 4A. FIG. 4C shows the side cross-sectional view of end plate 101 with the elements described in 4A along with an inside electrically insulating layer 302 and outside insulating layer 301 according to an embodiment of the present disclosure. In this example, the CIBS board 402 is shown extending up to and surrounding both electrode terminals 201 and 202. The span of the CIBS board may extend up to and possibly surround the electrode terminals which protrude from the inside surface of the prismatic end plate when the CIBS board is mounted on the inside surface of the prismatic end plate.

Figure 5A:
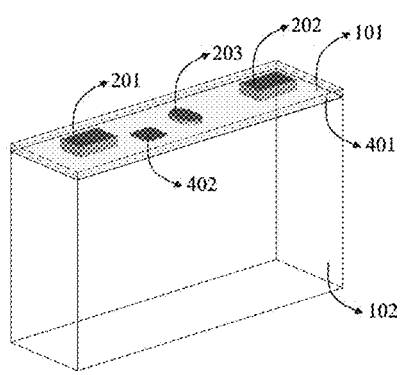
FIG. 5A, FIG. 5B, and FIG. 5C show an example of an isometric, inside top, and side cross-sectional view of a battery cell and its prismatic end plate comprising a CIBS board spanning from the inside surface to the outside surface of the end plate.
Figure 5B:
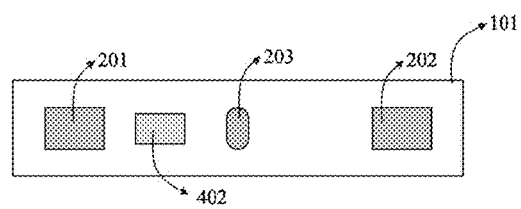
Figure 5C:
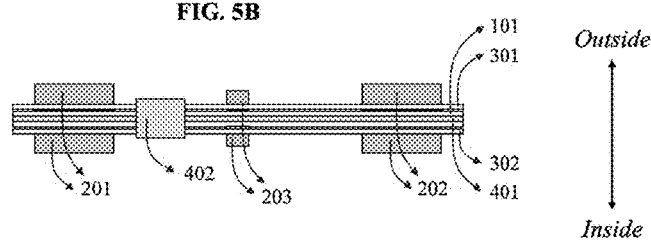

FIG. 5A, FIG. 5B, and FIG. 5C show an isometric, inside top, and side cross-sectional view of a battery cell prismatic end plate 101 comprising a CIBS board 402 and board substrate 401 spanning from the inside surface to the outside surface (optionally) of the prismatic end plate, and with the inclusion of electrode terminals 201 and 202, gas pressure relief valve 203 according to an embodiment of the present disclosure. In this example, FIG. 5A shows end plate 101 attached to cell body 102. In this example, the CIBS board 402 may provide significantly more structural support than in embodiments where it is simply mounted to either side of a separate prismatic end plate component. In this example the prismatic end plate 101 has electrode terminal 201, which is connected electrically to either the positive or negative electrode within the cell, and electrode terminal 202, which is connected to the opposite polarity electrode from 201 and insulating layers 301 and 302. Instant example of FIGS. 5A, 5B and 5C, an additional benefit of this arrangement over FIGS. 4A, 4B and 4C is that it may allow the data transmission elements to have stronger signal allowing longer distance transmission and communication when they are located on the outside surface of the prismatic end plate depending on the use case scenarios.

FIG. 6A, FIG. 6B, FIG. 6C, FIG. 6D and FIG. 6E show an isometric, inside top, and side cross-sectional views of a battery cell which has multiple prismatic end plates 101 according to an embodiment of the present disclosure. FIGS. 6B (inside top view) and 6D (side cross-sectional view) show, one prismatic end plate 101 has electrode terminal 201 that may be connected electrically to either the positive or negative electrode within the cell, gas pressure relief valve 203, CIBS board 402 and board substrate 401. FIG. 6C (inside top view) and FIG. 6E (side cross-sectional view) show the other prismatic end plate 101 has electrode terminal 202 that may be connected to the opposite polarity electrode from 201. For example, in another embodiment both prismatic end plates could contain CIBS boards (with their own microprocessor unit and/or other elements), and electrically insulating layers 301 and 302.

Figure 7A:
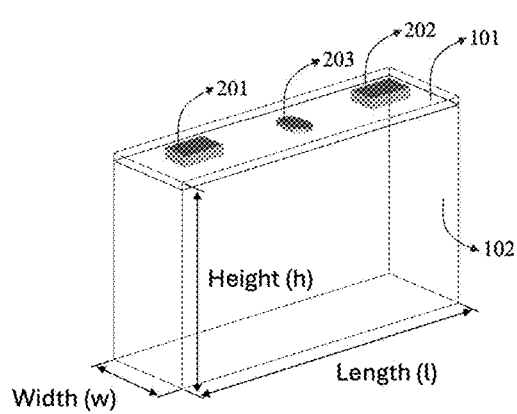
FIG. 7A and FIG. 7B show the typical dimensions of battery cells of various designs.
Figure 7B:
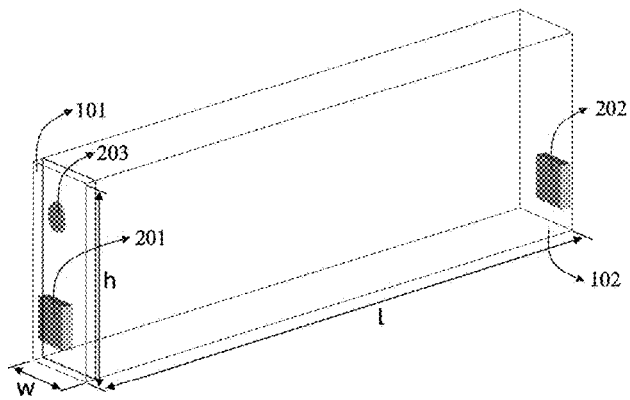

FIG. 7A and FIG. 7B show typical dimensions of battery cells of various designs. The height of a typical battery cell may range from 40 mm to 400 mm. The length of a typical battery cell may range from 40 mm to 1000 mm. The width of a typical battery cell may range from 5 mm to 100 mm. Table 1 presents a few examples of battery cells and their dimensions. The tolerance of the dimension can range from 0.5 to 2 mm. In examples FIG. 7A and FIG. 7B, the battery cell has the prismatic end plate 101 has electrode terminals 201 and 202, gas pressure relief valve 203, and battery cell body 102.

TABLE 1

| Example (no. of end plates) | Height (mm) | Length (mm) | Width (mm) |
| --- | --- | --- | --- |
| 1 (1) | 112 | 148 | 39 |
| 2 (1) | 206 | 172 | 28 |
| 3 (1) | 204 | 174 | 72 |
| 4 (2) | 118 | 574 | 22 |
| 5 (2) | 118 | 905 | 13.5 |
| 6 (2) | 90 | 484 | 13.5 |

Figure 8A:
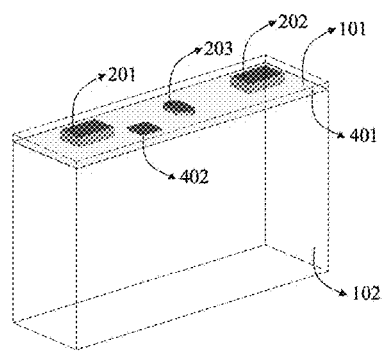
FIG. 8A, FIG. 8B, and FIG. 8C show an example of a schematic layout and functionality of the CIBS board, where the antenna is integrated directly into the main board.
Figure 8B:
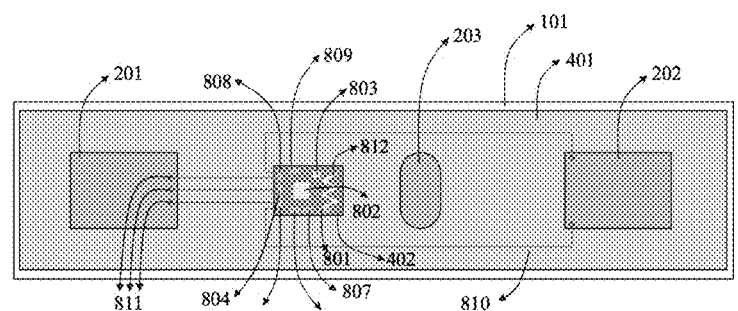
Figure 8C:
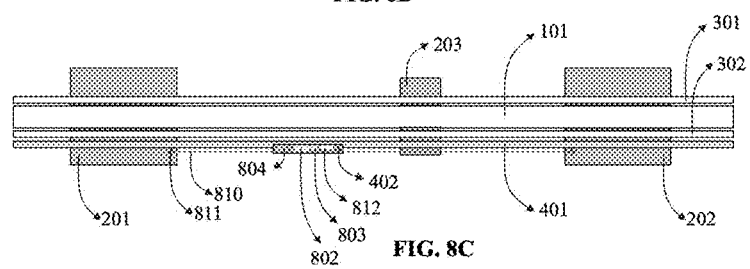

FIG. 8A, FIG. 8B and FIG. 8C show an example of a schematic of the layout and functionality of the CIBS board, where the data transmission unit and antenna are integrated alongside the microprocessor unit, sensors, and data storage unit according to an embodiment of the present disclosure. FIG. 8A shows the prismatic end plate 101 has CIBS board 402 mounted to its inside surface via board substrate 401. In this example, end plate 101 has electrode terminals 201 and 202, gas pressure relief valve 203 and is sealed to cell body 102. FIG. 8B (top inside view) and FIG. 8C (side cross-sectional view) show CIBS board 402 has microprocessor unit 802, data transmission unit 801, wireless antenna 812, data storage unit 803, current sensor 804, power unit 805, pressure sensor 806, gas sensor 807, voltage sensor 808, and temperature sensor 809. Wherein the wire traces 810 connect sensors and power leads for the microprocessor unit to the connection pads 811.

Figure 9A:
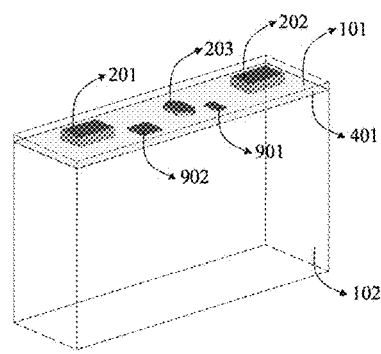
FIG. 9A, FIG. 9B, and FIG. 9C show an example of a schematic layout and functionality of the CIBS board, where the antenna is integrated discretely from the main microprocessor unit.
Figure 9B:
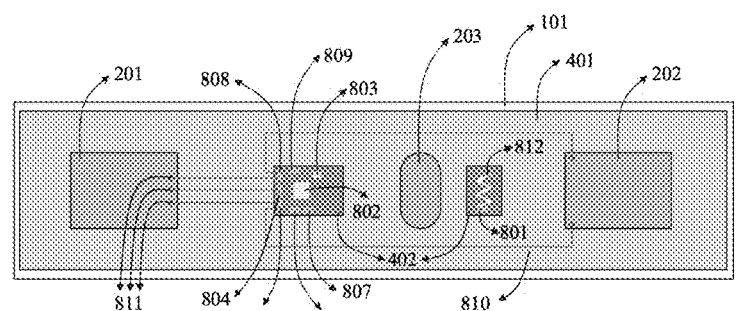
Figure 9C:
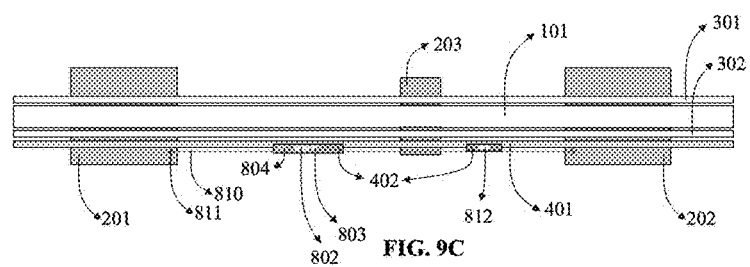

FIG. 9A, FIG. 9B and FIG. 9C show an example of a schematic of the layout and functionality of the CIBS board of a different design, where the data transmission unit 801 and antenna 812 are integrated discretely from the microprocessor unit, sensors, and data storage unit according to an embodiment of the present disclosure. As one embodiment, FIG. 9A shows the prismatic end plate 101 has CIBS board 402 mounted to its inside surface via board substrate 401, electrode terminals 201 and 202, gas pressure relief valve 203, and is sealed to cell body 102. FIG. 9B (inside top view) and FIG. 9C (side cross-sectional view) show CIBS board 402 containing microprocessor unit 802, data storage unit 803, current sensor 804, power unit 805, pressure sensor 806, gas sensor 807, voltage sensor 808, temperature sensor 809, data transmission unit 801 and wireless antenna 812. In this example, wire traces 810 on substrate 401 connect sensors and power leads for the processor to the connection pads 811. Alternatively, the microprocessor unit, and data transmission unit may be connected by conductive traces within the CIBS board or via short-range wireless transmission.

Figure 10:
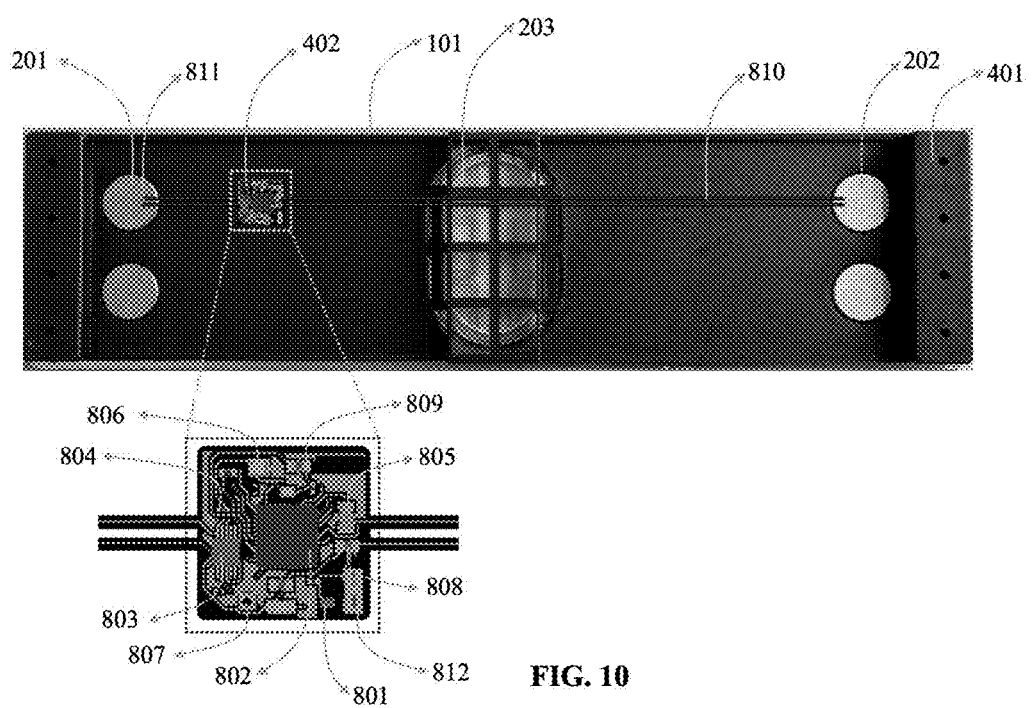
FIG. 10 shows a picture of an inside view of CIBS-integrated prismatic end plate, where the antenna is integrated directly into the main board.

FIG. 10 shows a picture of an inside view of a CIBS-integrated prismatic end plate, where the antenna is integrated directly into the main board according to an embodiment of the present disclosure. In this example prismatic end plate 101 has CIBS board 402 mounted to its inside surface on one of its insulating layers via board substrate 401. In this example the electrode terminal 201 and electrode terminal 202 are shown with voltage sense and power leads connected to CIBS board 402. In this example, CIBS board 402 contains and data transmission unit 801, wireless antenna 812, microprocessor unit 802, data storage unit 803, current sensor 804, power unit 805, pressure sensor 806, gas sensor 807, voltage sensor 808, and temperature sensor 809. In this example, wire traces 810 on board substrate 401 connect sensors and power leads for the processor to the connection pads 811. In this example, gas pressure relief valve 203 is also shown.

Figure 11:
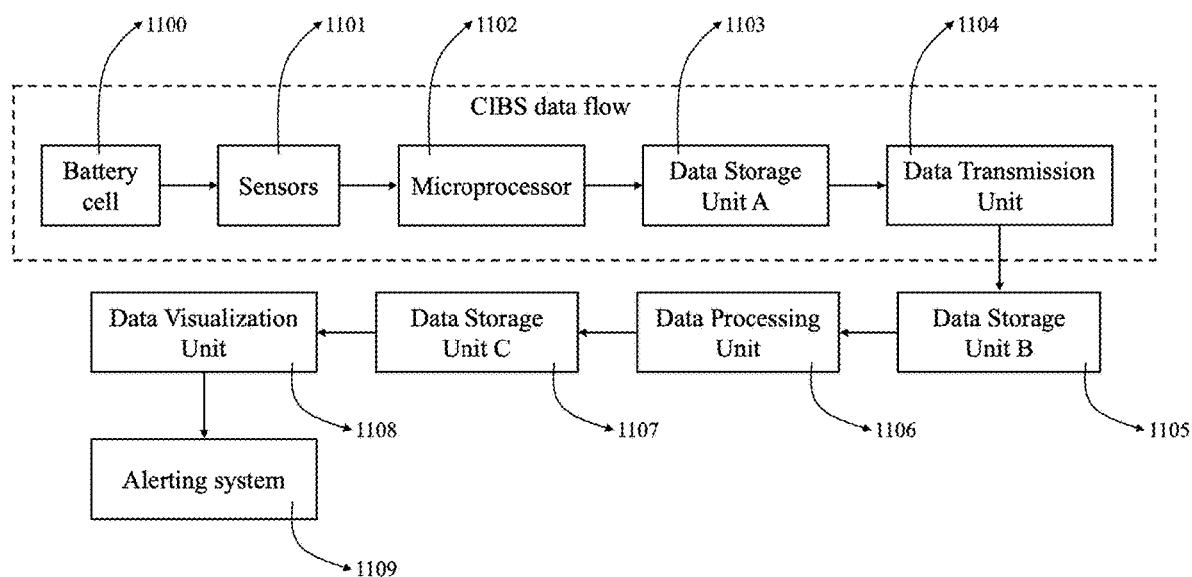
FIG. 11 shows a conceptual flowchart for CIBS data acquisition, processing, storage, visualization, and alerting.

FIG. 11 shows a flowchart for CIBS data acquisition, processing, storage, visualization, and alerting according to an embodiment of the present disclosure. In this example data about the Battery Cell 1100 is collected from Sensors 1101 located on the CIBS board or attached directly to the cell. In this example data is acquired by the Microprocessor unit 1102 and then optionally stored in Data Storage Unit A 1103 before being passed downstream via the Data Transmission Unit 1104 to Data Storage Unit B 1105 which is located either at the "edge" or in the "cloud" and then on to Data Processing Unit 1106 and then on to Data Storage Unit C 1107 located in the "cloud" and optionally to a Data Visualization Unit 1108 and alerting system 1109. In other instances, alerting may be triggered from the microprocessor unit 1102, the data transmission unit 1104, or the data processing unit 1106 located in a cloud or an edge, for example.

Figure 12:
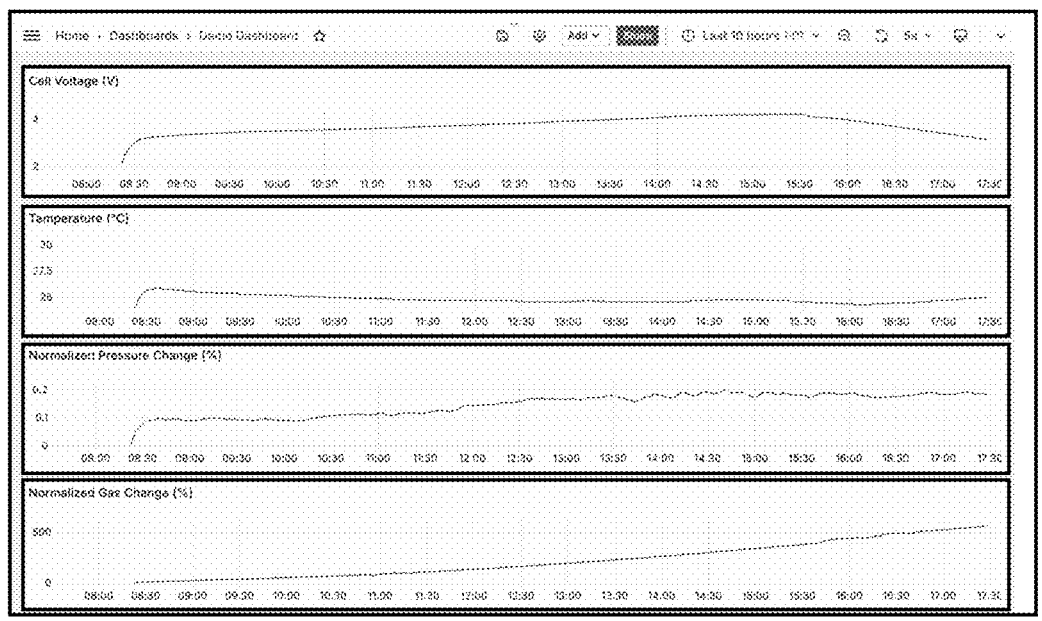
FIG. 12 shows an example of a potential data visualization unit in the form of a dashboard application for data captured using a battery cell with CIBS hardware.

FIG. 12 shows an example of a potential data visualization unit in the form of a dashboard application for data captured using a battery cell with CIBS hardware according to an embodiment of the present disclosure. In this example data visualization unit 1201 is shown as a dashboard application which allows plotting of time series data collected from the various sensor (i.e. voltage, internal temperature, pressure, gas composition) integrated as part of CIBS over various time windows.

Figure 13A:
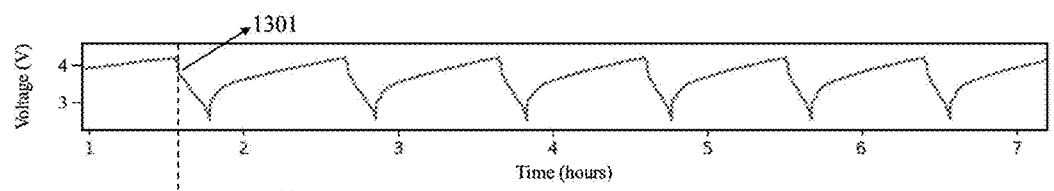
FIG. 13A, FIG. 13B, FIG. 13C, and FIG. 13D show an example data visualization including alerting thresholds and plots for voltage, current, temperature and pressure change data captured using a battery cell with CIBS hardware.
Figure 13B:
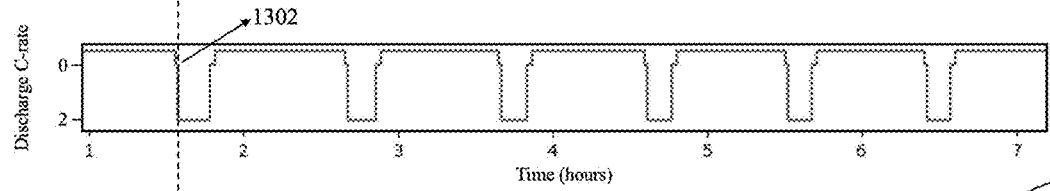
Figure 13C:
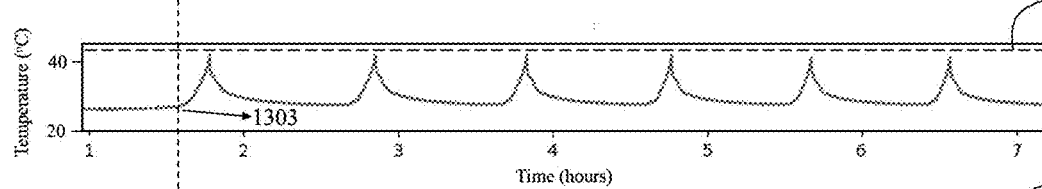
Figure 13D:
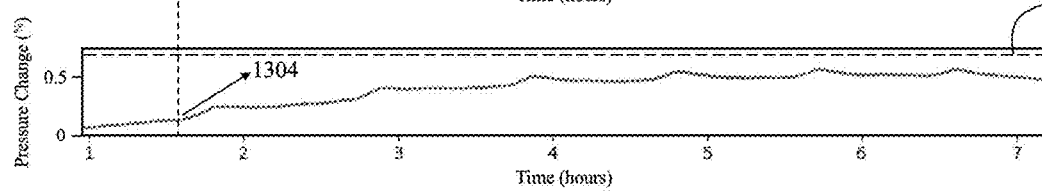
Figures 14A, 14B, 14C, 14D:
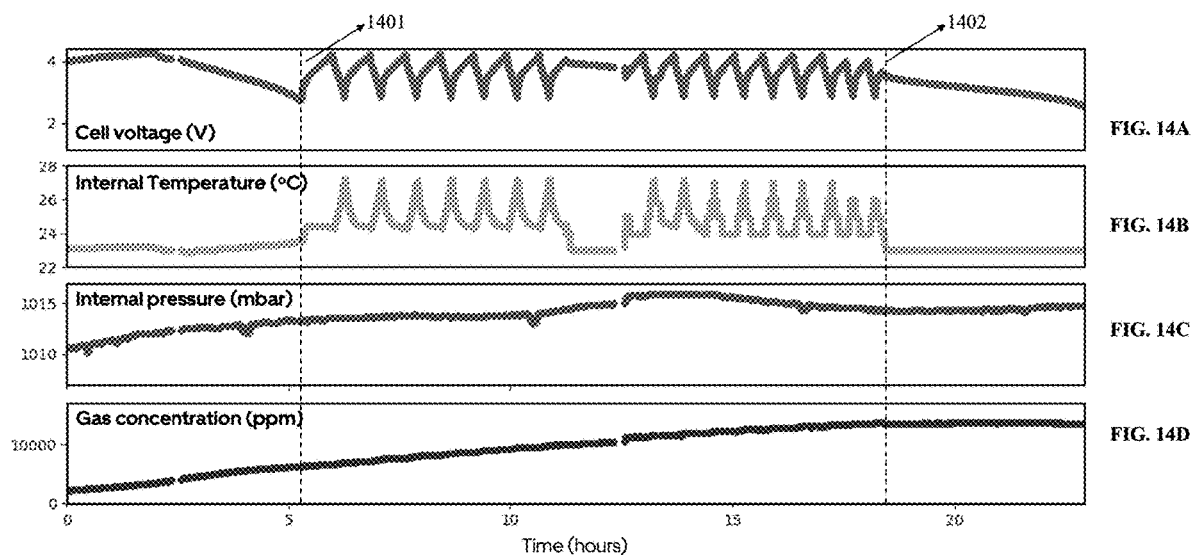
FIG. 14A, FIG. 14B, FIG. 14C, and FIG. 14D show an example data visualization highlighting the voltage, temperature, pressure, and gas concentration response inside of a cell using a battery cell with CIBS hardware.
Figures 15A, 15B, 15C, 15D:
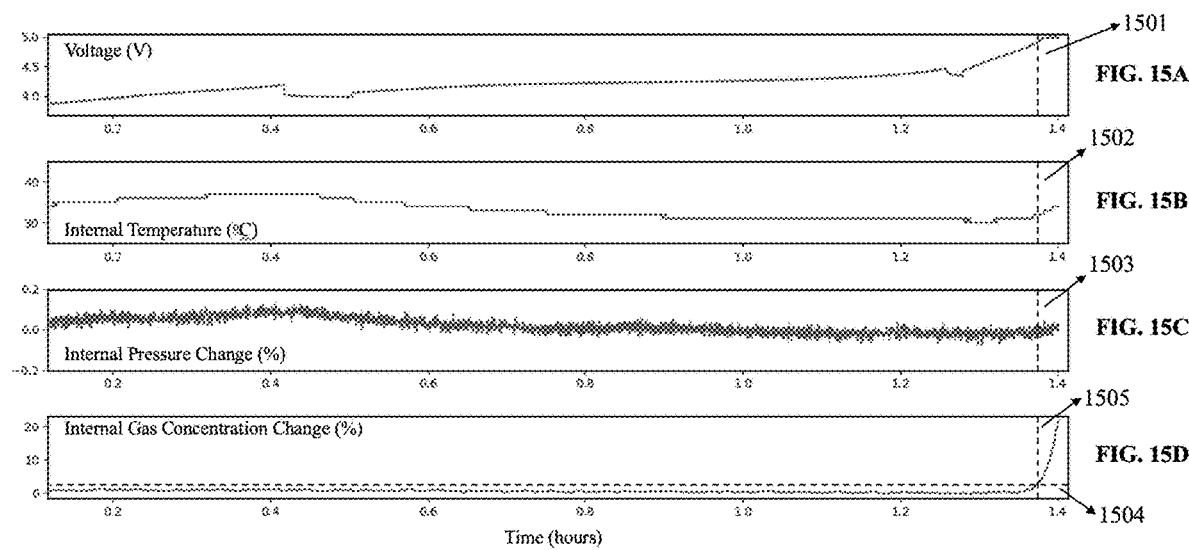
FIG. 15A, FIG. 15B, FIG. 15C, FIG. 15D show an example data visualization highlighting the voltage and gas response inside of a cell using a battery cell with CIBS hardware for a cell which is experiencing abnormal operation.

FIG. 13A, FIG. 13B, FIG. 13C and FIG. 13D show an example data visualization for data captured using a battery cell with CIBS hardware according to an embodiment of the present disclosure. In this example, time series data for cell voltage, current, internal temperature, and internal gas pressure are shown for a cell undergoing a sequence of charge and discharge steps (FIG. 13B). The vertical dotted line 1301 indicates the beginning of high-rate discharge sequence, while the two horizontal lines are user-specified alerting thresholds for temperature 1305 and pressure 1306 (FIG. 13C and FIG. 13D). The threshold can be automatically or manually adjusted by a user, depending on the battery cell chemistry, format, or operating conditions. When measured levels exceed the specified thresholds, alerts can be sent so that safety mitigation actions can be taken and thus reduce any risk to persons or property. In this example, the initial measured responses to this high-rate discharge current 1302 are shown for voltage 1301 (FIG. 13A), internal temperature 1303 (FIG. 13C), and internal pressure 1304 (FIG. 13B). The increased pressure in 1304 can be attributed to a combination of gas generation from reactions within the cell and a result of the increased temperature of gases in the sealed cell.

FIG. 14A, FIG. 14B, FIG. 14C, and FIG. 14D show an example data visualization highlighting the temperature and gas response inside of a cell enabled by CIBS hardware according to an embodiment of the present disclosure. In this example, time series data for cell voltage (FIG. 14A), internal temperature (FIG. 14B), internal gas pressure (FIG. 14C), and internal gas concentration (FIG. 14D) are shown for a cell undergoing a sequence of charge and discharge steps. The vertical dotted lines 1401 and 1402 indicate the beginning and end of a high-rate discharge sequence, respectively. It can be seen that the gas concentration (FIG. 14D) and pressure (FIG. 14C) both increase during the period of charge-discharge cycling but cease to increase once the cycling has stopped at 1402. The temperature response (FIG. 14B) can also be seen to increase generally during the periods of high-rate discharges but settles back to normal when the cycling has stopped.

Figure 16:
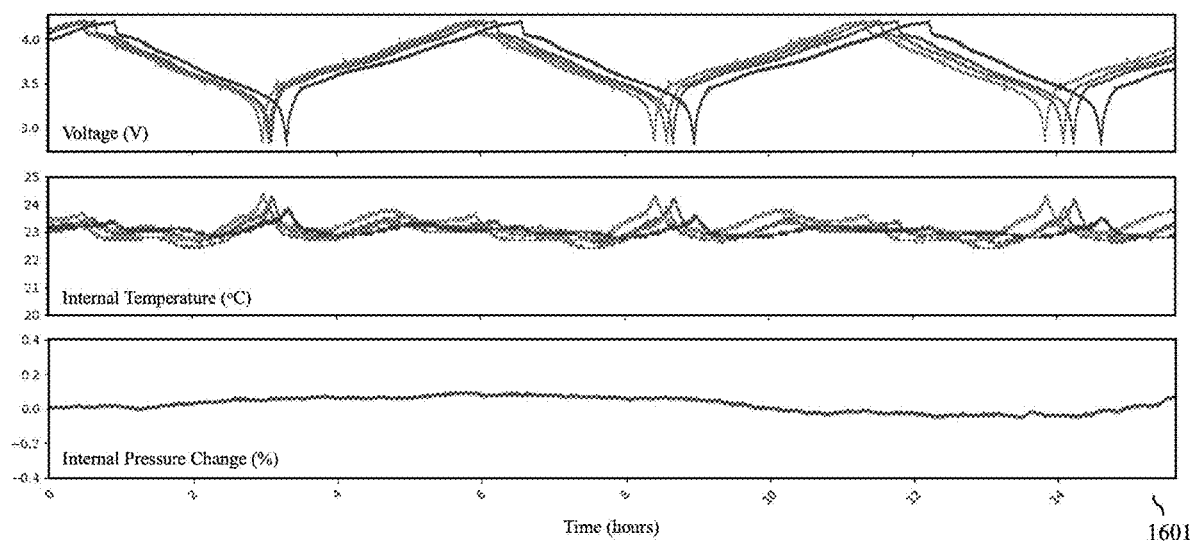
FIG. 16 shows an example data visualization for data collected simultaneously from multiple cells each using CIBS.

FIG. 15A, FIG. 15B, FIG. 15C, and FIG. 15D show an example data visualization highlighting the voltage (FIG. 15A), temperature (FIG. 15B), pressure (FIG. 15C), and gas concentration (15D) response inside of a cell enabled with CIBS hardware for a cell which is experiencing abnormal operation according to an embodiment of the present disclosure. In this example, the vertical dotted line 1501 marks the voltage response during the onset of the abnormal cell operation. The vertical dotted line 1502 marks the temperature response during the onset of the abnormal cell operation. The vertical dotted line 1503 marks the gas pressure response during the onset of the abnormal cell operation. The vertical dotted line 1505 marks the gas concentration response during the onset of the abnormal cell operation while the horizontal dotted line 1504 is the user-specified alerting thresholds for the gas concentration which will provide advanced warning of a potential safety issue when gas generation initially starts to accelerate. FIG. 16 shows an example data visualization for live data collected simultaneously from multiple battery cells each using CIBS.

Figure 17:
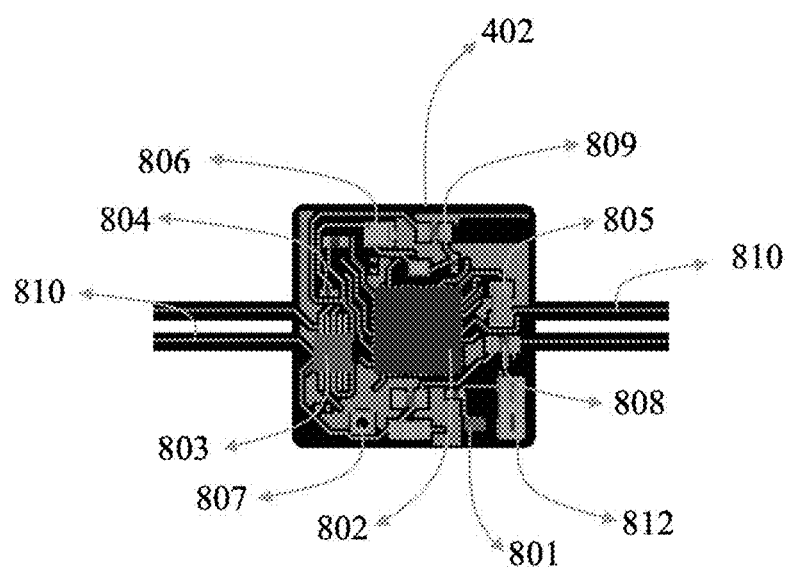
FIG. 17 shows an individual CIBS board that may be used as a standalone device.

FIG. 17 shows a CIBS board (independent of any specific cell type or form factor), where the antenna is integrated directly into the board according to an embodiment of the present disclosure. In this example CIBS board 402 which contains data transmission unit 801, antenna 812, microprocessor 802, data storage unit 803, current sensor 804, power unit 805, pressure sensor 806, gas sensor 807, voltage sensor 808, and temperature sensor 809. In this example, wire traces 810 can be extended to connect sensors and power leads for the processor to the connection pads located on the battery cell. In this example cells of different types and form factors (i.e. prismatic, pouch, and cylindrical) can benefit from the use of a chip-integrated intelligent battery system capability.

INDUSTRIAL USE

Chip-integrated-battery-system (CIBS) has several industrial applications. Broadly speaking, CIBS has applications in the EV, stationary storage, and portable electronics markets. Within the stationary storage market, CIBS has applications in grid, data center, industrial, and residential segments. EV market applications: By monitoring temperature and pressure within the battery cell, CIBS can be used to detect the precursors to thermal runaway before a cell enters the irreversible thermal runaway process. By doing so, CIBS allows the battery management system (BMS) to shut down or bypass at-risk cells from operation, thus preventing these cells from catching fire. Additionally, by monitoring parameters such as voltage and current and others in a granular manner, CIBS allows for a precise estimation of state-of-health (SOH) and remaining useful life (RUL) of the battery. A precise estimation of SOH/RUL enables pre-owned EVs to be certified with greater precision. Furthermore, CIBS allows for secondary use of the batteries after they reach end-of-life in EVs by providing insights into what performance capabilities may remain in each cell within the pack.

Moreover, CIBS allows for securitization of EV battery assets because an EV battery pack health and life can be estimated precisely. This would allow financial companies to finance the purchase of batteries by allowing the batteries to be leased to EV owners. Financial companies could get paid by the estimated battery performance degradation induced by EV owners, similar to how usage-based billing is done for other products. Stationary storage market applications: As discussed earlier, CIBS allows for securitization of stationary storage battery assets. This allows for financing of battery assets by financial corporations, increasing competition and reducing the price of battery provided services. Stationary batteries are used on the grid to provide services such as frequency regulation, injecting or absorbing power from the grid quickly. CIBS enables stationary batteries to provide services for longer time by accurately estimating the health of the battery. CIBS enables distributed energy storage and management in a data center. Unlike the conventional power architecture in which power is supplied from a central source, CIBS allows for power to be delivered and safely managed directly at the server racks. Portable electronics market applications: CIBS may have applications in consumer or other portable electronics which have integrated batteries whose useful remaining life may impact their practical utility or future resale value. For example, a device's suitability for deployment into the field for long durations could be more accurately assessed with the insights provided by CIBS.

What is claimed is:

1. A chip integrated battery system device, comprising:
   a prismatic end plate comprising of a chip integrated battery system board integrated with data transmission unit, an antenna, a microprocessor unit, a data storage unit, a positive and negative electrode terminal each, and a gas pressure release valve placed from inside out; wherein the prismatic end plate is layered inside with electrically insulating layer and with another outside electrically insulating layer;
   a sensor to be connected to the board to measure attribute of a cell interior, wherein the sensor comprises a temperature sensor, current sensor, voltage sensor, gas pressure sensor, gas species sensor, cell identifier, wherein a direct measurement of internal battery cell temperature, pressure, and gas formation and composition are performed to identify unrealized issues and trigger warning of developing safety risks much sooner than traditional sensing technology;
   a cell identifier 205 is one of a label, barcode, QRcode, a radio frequency identifier (RFID) or a combination thereof to uniquely identify the cell; and
   a data is gathered from the battery acquired by a microprocessor unit, stored in the data storage unit to be passed to a data transmission unit located in the board to provide instant visualization of various parameters inside the cell to assess the cell's performance.

2. The chip integrated battery system device of claim 1, wherein the board is mounted internally on the cell on the top, side or bottom.

3. The chip integrated battery system device of claim 1, further comprising of one or more different type of the actuator to control the operation of the cell.

4. The chip integrated battery system device of claim 1, wherein one or more boards are sealed together to accommodate various components of the sensor, actuator, microprocessor unit, data storage unit, data transmission unit, wireless antenna, and power source lead for each electrode.

5. The chip integrated battery system device of claim 1, wherein a multiple end of the cell are sealed by the prismatic end plate.

6. A chip integrated battery system device, comprising;
   a prismatic end plate 101 comprising a chip integrated battery system board (board) (402) embedded between a board substrate spanning from the inside surface (301) to the outside surface (302) of the prismatic end plate, integrated with an electrode terminals 201 and 202, a cell identifier (205) and a gas pressure relief valve 203, wherein the cell identifier 205 is one of a label, barcode, QRcode, a radio frequency identifier (RFID) or a combination thereof to uniquely identify a cell,
   wherein a direct measurement of internal cell temperature, pressure, gas formation and gas composition are performed to identify unrealized issues and trigger warning of developing safety risks much sooner than traditional sensing technology;
   a sensor to be connected to the board to measure attribute of the cell interior, wherein the sensor consists of a temperature sensor, current sensor, voltage sensor, gas pressure sensor and gas species sensor; and
   a microprocessor unit, data storage unit, data transmission unit, power source lead integrated in the board, to provide instant visualization of various parameters inside the cell to assess the cell performance.

7. The chip integrated battery system device of claim 6, further comprising of the prismatic end plate to be physically mounted inside the cell.

8. The chip integrated battery system device of claim 6, further comprising of a data processing unit located in a cloud or an edge.

9. A chip integrated battery system device, comprising;
   a chip integrated battery system board (board) mounted on the inside surface of an insulating layer integrated with a data transmission unit, wireless antenna, microprocessor unit, data storage unit, cell identifier, power unit, sensor and a pair of wire traces, wherein a pair of wire trace is connected to power to all electronic components on the board and the second pair of traces are used by a voltage sensor to measure a cell's voltage; and
   the sensor to be connected to a chip integrated battery system board (board) to measure attribute of the cell interior, wherein the sensor consists of a temperature sensor, current sensor, the voltage sensor, a gas pressure sensor and a gas species sensor, wherein a direct measurement of internal battery cell temperature, pressure, and gas formation and composition are performed to identify unrealized issues and trigger warning of developing safety risks much sooner than traditional sensing technology.

10. The chip integrated battery system device of claim 9, further comprising of an end plate.

11. The chip integrated battery system device of claim 9, further comprising of one or more different types of actuators to control the operation of a cell.

12. The chip integrated battery system device of claim 9, further comprising of a data processing unit located in a cloud or an edge.

13. The chip integrated battery system device of claim 9, wherein the chip integrated battery system board (board) is a standalone device that can be used inside of the cell.

14. The chip integrated battery system device of claim 9, wherein the cell identifier 205 is one of a label, barcode, QR code, radio frequency identifier (RFID) or a combination thereof to uniquely identify the cell.

* * * * *